(12) United States Patent
Sandmel et al.

(10) Patent No.: US 8,610,725 B2
(45) Date of Patent: Dec. 17, 2013

(54) FRAMEWORK FOR DYNAMIC CONFIGURATION OF HARDWARE RESOURCES

(75) Inventors: Jeremy Todd Sandmel, San Mateo, CA (US); John Stuart Harper, San Francisco, CA (US); Kenneth Christian Dyke, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1229 days.

(21) Appl. No.: 11/957,275

(22) Filed: Dec. 14, 2007

(65) Prior Publication Data
US 2009/0100257 A1 Apr. 16, 2009

Related U.S. Application Data

(60) Provisional application No. 60/979,015, filed on Oct. 10, 2007.

(51) Int. Cl.
*G06F 15/00* (2006.01)
*G06F 15/16* (2006.01)
*G06F 1/00* (2006.01)
*G06T 1/00* (2006.01)

(52) U.S. Cl.
USPC ............. 345/501; 345/502; 345/522; 712/32; 712/34; 713/100; 713/300

(58) Field of Classification Search
None
See application file for complete search history.

(56) References Cited

U.S. PATENT DOCUMENTS

2005/0231502 A1* 10/2005 Harper et al. ............... 345/418
2007/0002053 A1    1/2007 Hill et al.
2007/0283175 A1* 12/2007 Marinkovic et al. .......... 713/320

FOREIGN PATENT DOCUMENTS

| EP | 1 074 912 A1 | 2/2001 |
| WO | WO9952083 A1 | 10/1999 |
| WO | WO2005106652 A1 | 11/2005 |
| WO | 2006042300 A2 | 4/2006 |

OTHER PUBLICATIONS

PCT Notification Concerning Transmittal of International Preliminary Report on Patentability (Chaper I of the Patent Cooperation Treaty in International Application No. PCT/US2008/079427 mailed on Apr. 22, 2010.
Communication pursuant to Article 94(3) EPC for Application No. 08 837 940.9, dated Apr. 7, 2011, 6 pages.
State Intellectual Property Office of the People's Republic of China First Office Action and English translation for Application No. 200880120023.9 dated Sep. 29, 2011, 6 pages.
Examination Report received in corresponding EP Application No. 08837940.9, dated Jan. 29, 2013.

* cited by examiner

*Primary Examiner* — Tize Ma
(74) *Attorney, Agent, or Firm* — Wong, Cabello, Lutsch, Rutherford & Brucculeri, LLP

(57) ABSTRACT

Among other things, dynamically selecting or configuring one or more hardware resources to render a particular display data includes obtaining a request for rendering display data. The request includes a specification describing a desired rendering process. Based on the specification and the display data, hardware is selected or configured. The display data is rendered using the selected or configured hardware.

24 Claims, 5 Drawing Sheets

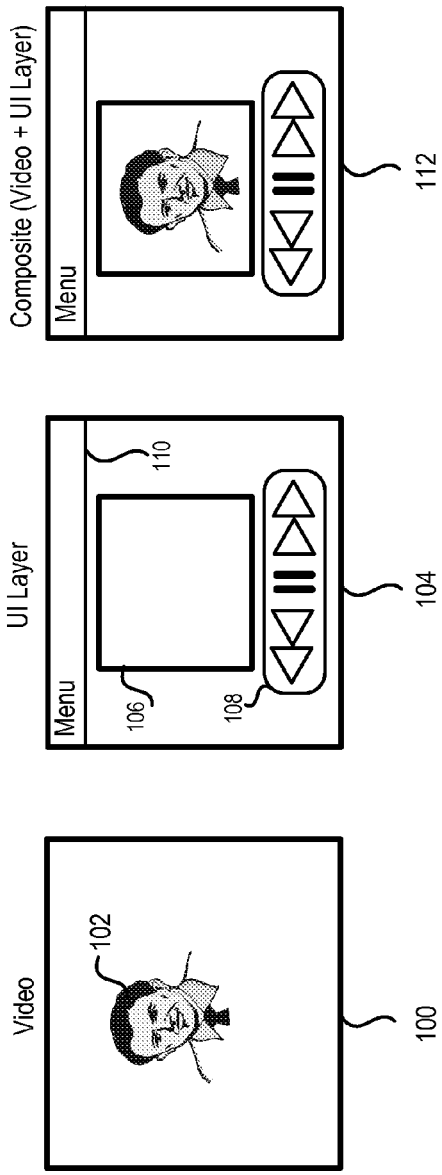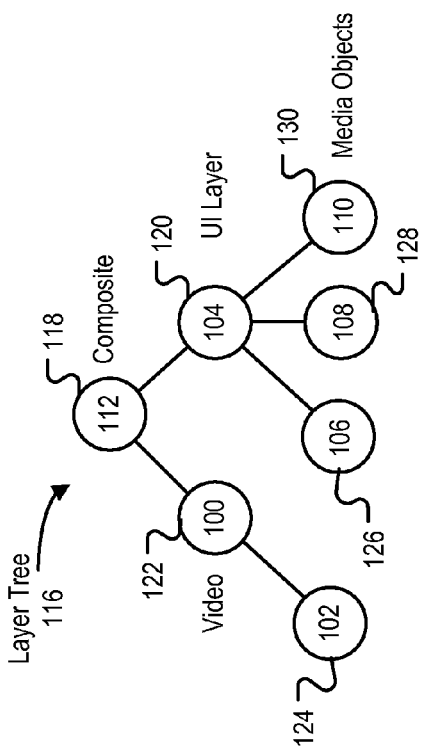

FRAMEWORK FOR DYNAMIC CONFIGURATION OF HARDWARE RESOURCES

CROSS-REFERENCE TO RELATED APPLICATIONS

This application is a non-provisional and claims the benefit of priority under 35 USC 119(e) of U.S. Application Ser. No. 60/979,015, filed Oct. 10, 2007. The disclosure of the prior application is considered part of, and is incorporated by reference herein, the disclosure of this application.

TECHNICAL FIELD

This application relates to configuring and managing hardware resources.

BACKGROUND

An application can render display data such as images, graphics, video, etc. by expressly providing instructions to the available hardware resources in display system (e.g., a computing device or system). To interface with a particular hardware resource, the application can use a custom application programming interface (API) specifically coded for that hardware resource provided by the system for the application. Using the APIs, the application can divide up the rendering processes by identifying a specific hardware resource to render a particular graphics workload (display data). For example, the application can specify that a 3D rendering pipeline should render graphics or image data by using a 3D rendering API (e.g., Open GL API). To specify that video decoding pipeline should render movie data, the application can specify using a movie playback API.

Because the available hardware resources can vary from one device to another, an application may not be able to fully take advantage of the various available hardware resources. In addition, when one or more of the hardware resources are changed/replaced, a new API may be needed to interface with the new hardware.

SUMMARY

In one aspect, an example process of managing hardware resources includes receiving a request for rendering display data that includes a specification describing the display data. Based on the specification and the display data, hardware is dynamically selected or configured. The display data is rendered using the selected or configured hardware.

Implementations can optionally include one or more of the following features. The received request can includes a layer tree that describes a hierarchical organization of the display data. The display data can be rendered by compositing the display data using the configured or selected hardware. To dynamically select or configure the hardware, a media type can be identified for each of the one or more media objects. In addition, the hardware can be selected or configured to render each media object based on the identified media type. Dynamically selecting or configuring the hardware can include setting an operating mode of the selected or configured hardware. In addition, a list of available hardware can be identified, when detecting a change in the list of available hardware, the list can be updated. Also, rendering the display data can include independently interfacing with each of the configured or selected hardware. Further, dynamically selecting or configuring the hardware can include setting one or more parameters of one or more application programming interfaces (APIs).

In another aspect, the example process of managing hardware resources can be implemented as a computer program product, embodied on a computer-readable medium, operable to cause a data processing apparatus to perform operations. For example, the computer program product is designed to cause the data processing apparatus to receive a request for rendering display data, the request including a specification describing the display data. The computer program product is designed to cause the data processing apparatus to dynamically select or configure hardware based on the display data and the specification. Further, the computer program product is designed to cause the data processing apparatus to render the display data using the selected or configured hardware.

Implementations of the computer program product can optionally include one or more of the following features. The computer program product can be designed to cause the data processing apparatus to receive the request that includes a layer tree that describes a hierarchical organization of the display data. Also, the computer program product can be designed to cause the data processing apparatus to render the display data including compositing the display data using the configured or selected hardware. The computer program product can be further designed to cause the data processing apparatus to dynamically select or configure the hardware. Dynamically selecting or configuring the hardware can include identifying a media type for each of the one or more media objects, and selecting or configuring the hardware based on the identified media type. Further, the computer program product can be designed to cause the data processing apparatus to configure or select the hardware by setting an operating mode of the one or more hardware resources. Also, the computer program product can be designed to cause the data processing apparatus to identify a list of available hardware, and when detecting a change in the list of available hardware, updating the list. Also, the computer program product can be designed to cause the data processing apparatus to render the display data by independently interfacing with each of the selected or configured hardware. In addition, the computer program product can be designed to cause the data processing apparatus to select or configure the hardware including setting one or more parameters of one or more application programming interfaces (APIs).

In another aspect, a system for managing hardware resources can include one or more applications designed to generated a request for rendering display data, the request including a specification describing the display data. The system also includes a decision logic, separate from the one or more applications, connected to the one or more applications. The decision logic is designed to receive the generated request from the one or more applications. Also the decision logic is designed to dynamically select or configure hardware based on the display data and the specification. Further, the decision logic is designed to render the display data using the selected or configured hardware.

Implementations of the system can optionally include one or more of the following features. The application can be designed to generate the request that includes a layer tree that describes a hierarchical organization of the display data. The decision logic can be designed to render the display data including compositing the display data using the configured one or more hardware resources. Also, the decision logic can be designed to dynamically select or configure the hardware. Dynamically selecting or configuring the hardware includes identifying a media type for each of the one or more media objects, and selecting the hardware based on the identified media type. Also, the decision logic can be designed to configure or select the hardware including setting an operating mode of the hardware. The decision logic can be designed to identify a list of available hardware, and when detecting a change in the list of available hardware, update the list. Further, the decision logic can be designed to render the display data including independently interfacing with each of the configured or selected hardware. Also, the decision logic can be designed to configure or select the hardware including setting one or more parameters of one or more application programming interfaces (APIs).

In another aspect, an apparatus for managing hardware resources includes one or more applications designed to generated a request for rendering display data. The request includes a specification that describes the display data. The apparatus includes a decision logic, separate from the one or more applications, connected to the one or more applications. The decision logic is designed to receive the generated request from the one or more applications. The decision logic is designed to dynamically select or configure hardware based on the display data and the specification. Also, the decision logic is designed to rendering the display data using the selected or configured hardware. Further, the system includes a display unit configured to display the rendered display data.

The subject matter described in this specification potentially can provide one or more of the following advantages. Decision logic for determining a graphics processing path is provided in framework layer, so that available hardware resources can be dynamically allocated and configured to render a particular display data described by one or more applications without the need for those applications to choose the rendering hardware (by selecting a particular rendering API.) The application developer describes the display data and then decision logic in the framework layer determines which hardware to use, how to configure the selected hardware, etc. Because the decision logic includes specific knowledge about the available hardware resources, the decision logic can make dynamic decisions on how best to render the display data. Also, the decision logic can take advantages of specific functions and operating modes of each hardware resource when making the dynamic decisions. Further, the decision logic can configure the hardware resources to balance various performance tradeoffs.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

BRIEF DESCRIPTION OF THE DRAWINGS

FIGS. 1A, 1B and 1C illustrate exemplary display layers of various display data that can be rendered together on a screen.

FIG. 1D illustrates an example generated layer tree that describes relationships between layers and media objects.

DETAILED DESCRIPTION

Figure 2:
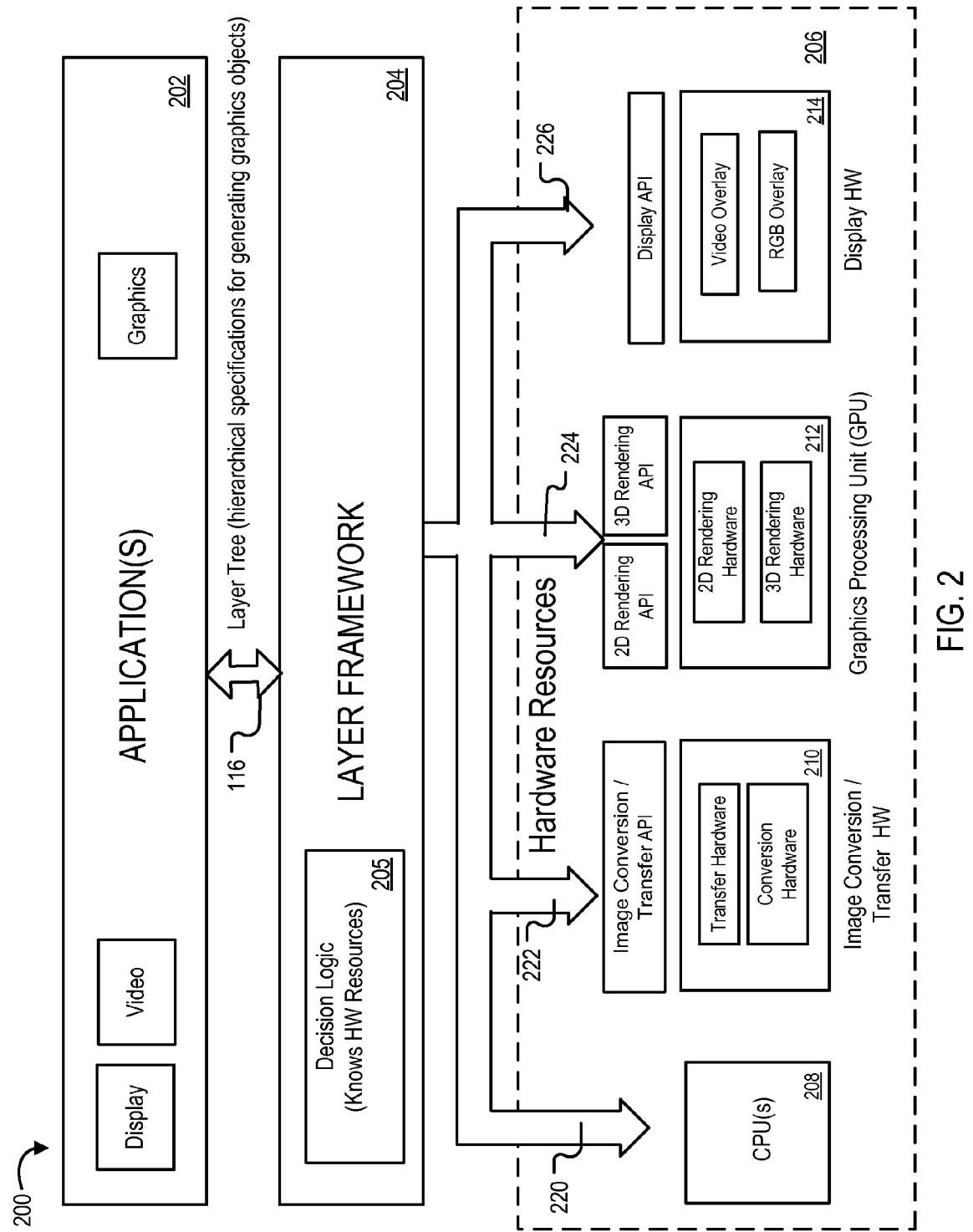
FIG. 2 is a block diagram of an example system for configuring hardware resources when dynamically rendering various display data.

FIGS. 1A, 1B and 1C illustrate exemplary display layers 100 and 104 of various display data that can be rendered together on a screen (e.g., a liquid crystal display (LCD)). The display data can include various media objects such as videos, images, graphics objects, etc. FIG. 1A shows an exemplary video layer 100 of a talking head video data 102. FIG. 1B shows an exemplary user interface (UI) layer 104 that includes various UI elements. For example, the UI layer 104 can include a menu object 110, video frame object 106, and video control object 108. FIG. 1C shows a composite 112 of the video layer 100 and the UI layer 104.

The composited display data 112 can be rendered onto a screen based on a generated layer tree 116 (illustrated in FIG. 1D) that describes the relationships among various layers and media objects. The layer tree 116 is a hierarchical data structure that describes hierarchical relationships among various media objects (e.g., layers, graphic objects, etc.) For example, the composited display data 112 can be represented as the root node 118 of the layer tree 116. Positioned below the root node 118 are the parent nodes 120, 122, that represent the video layer 100 and the UI layer 104 respectively. Each parent node 120, 122, can include various children nodes. For example, the parent node 122 that represents the video layer 100 includes a child node 124 that represents the talking-head video data 102. The parent node 120 that represents the UI layer 104 includes various children nodes 126, 128, 130. Each of the children nodes 126, 128, 130, represents a particular media object associated with the UI layer. For example, the child node 126 represents the display frame object 106. The child node 128 represents the display control object 108. The child node 130 represents the menu object 110.

FIG. 2 illustrates an example system 200 for configuring hardware resources when rendering various display data. The system 200 includes one or more applications (e.g., 202) that identify various display data to be composited and rendered on a screen. For example, application 202 generates a layer tree 116 to describe the identified display data to be composited and rendered. Instead of interfacing with the available hardware resources 206 directly, the application 202 interfaces with a layer framework 204. The layer framework 204 can be a software framework that is expressed as a set of abstract classes and methods describing how instances of the classes will collaborate to perform a task. The framework 204 can include support programs, code libraries, a scripting language, or other software to help develop and glue together different components of the application 202. Various parts of the layer framework 204 may be exposed to the application 202 through an application programming interface (API). In the example shown, the layer framework 204 includes decision logic 205 for making decisions on how to render the display data described in the layer tree 116. A desired rendering process is described by the layer tree 116. The framework layer 204 (using the decision logic 205) selects and configures hardware resources 206 to use for the desired rendering based on the display data and the layer tree (which defines the desired rendering). Thus, the layer tree 116 describes what (graphics workload or display data) should be rendered, but does not need to describe how the display data should be rendered (i.e., which hardware or API should be used for rendering or compositing). The decision logic in the layer framework handles/determines how the display data should be rendered.

In some implementations, the layer framework 204 is part of a software stack and is located between the application 202 (i.e., application layer) and the physical layer which includes the available hardware resources 206. In particular, the layer framework 204 receives a data structure representing the received layer tree 116, and the decision logic 205 in the layer framework 204 decides how best to render the display data described in the layer tree 116.

The available hardware resources 206 include various hardware subsystems that can be used to composite and render the desired display data. For example, hardware resources can include one or more central processing units (CPUs) 208, one or more image processing (conversion) and transfer devices 210 (e.g., a camera), one or more graphics processing units (GPUs) 212, and one or more output devices 214 (e.g., a display device such as an LCD). The image conversion/transfer hardware 210 can include an image transfer hardware, an image conversion hardware, etc. The GPU 212 can includes a 2D rendering hardware, a 3D rendering hardware, etc. The display hardware can also include a video overlay unit, an RGB overlay unit, etc.

The layer framework 204 interfaces with the various hardware resources using one or more APIs. For example, an image conversion/transfer API can be used to interface with the image conversion/transfer hardware 210. A 2D rendering API and a 3D rendering API can be used to interface with the 2D rendering hardware and the 3D rendering hardware of the GPU 212 respectively. Further, a display API can be used to interface with the video overlay unit and the RBG overlay unit of the display hardware 214.

The decision logic 205 determines how the display data described in the layer tree 116 will be rendered. For example, the decision logic 205 evaluates the available hardware resources 206 and dynamically identifies a particular hardware resource (in some instance more than one hardware resources) to render each component (e.g., each layer, media object, etc.) of the display data described in the layer tree 116. In addition, the decision logic 205 can identify a particular operation mode of the identified hardware resource.

Because the decision logic 205 of the layer framework 204 can dynamically determine which hardware resource(s) to use to render a particular display data, one or more of the several possible processing paths 220, 222, 224 and 226 can be selected. Each processing path 220, 222, 224 and 226 represents a communication path between the layer framework 204 and at least one of the hardware resources 206. In one aspect, the decision logic 205 generates an abstract description of how various layers of renderings should be ordered and dispatches the abstract description to some underlying hardware resource. Thus, the processing paths 220, 222, 224, 226, represent the choices in the underlying hardware resources that can be used to perform the rendering in the order determined by the decision logic 205. Depending on the needs of what's expressed in those layers, the decision logic 205 goes thorough an algorithm heuristic to select one or more of the available paths 220, 222, 224 and 226 to render each component (e.g., layers, media objects, etc.) of the display data. For example, the decision logic 205 can select to use
a 2D rendering engine, 3D engine, full geometric transform pipeline, an overlay scaler, a transfer hardware (e.g., DMA engine) that can be format converting, etc.

Because the decision logic 205 is located in the layer framework 204 (and separate from the application), the application 202 need not decide how to render the display data. Thus, the application 202 can simply describe the appearance of the display data (e.g., how the display data should look when rendered) without directly specifying how to render the display data. In addition, the application 202 need not perform any of the rendering process itself.

Figure 3:
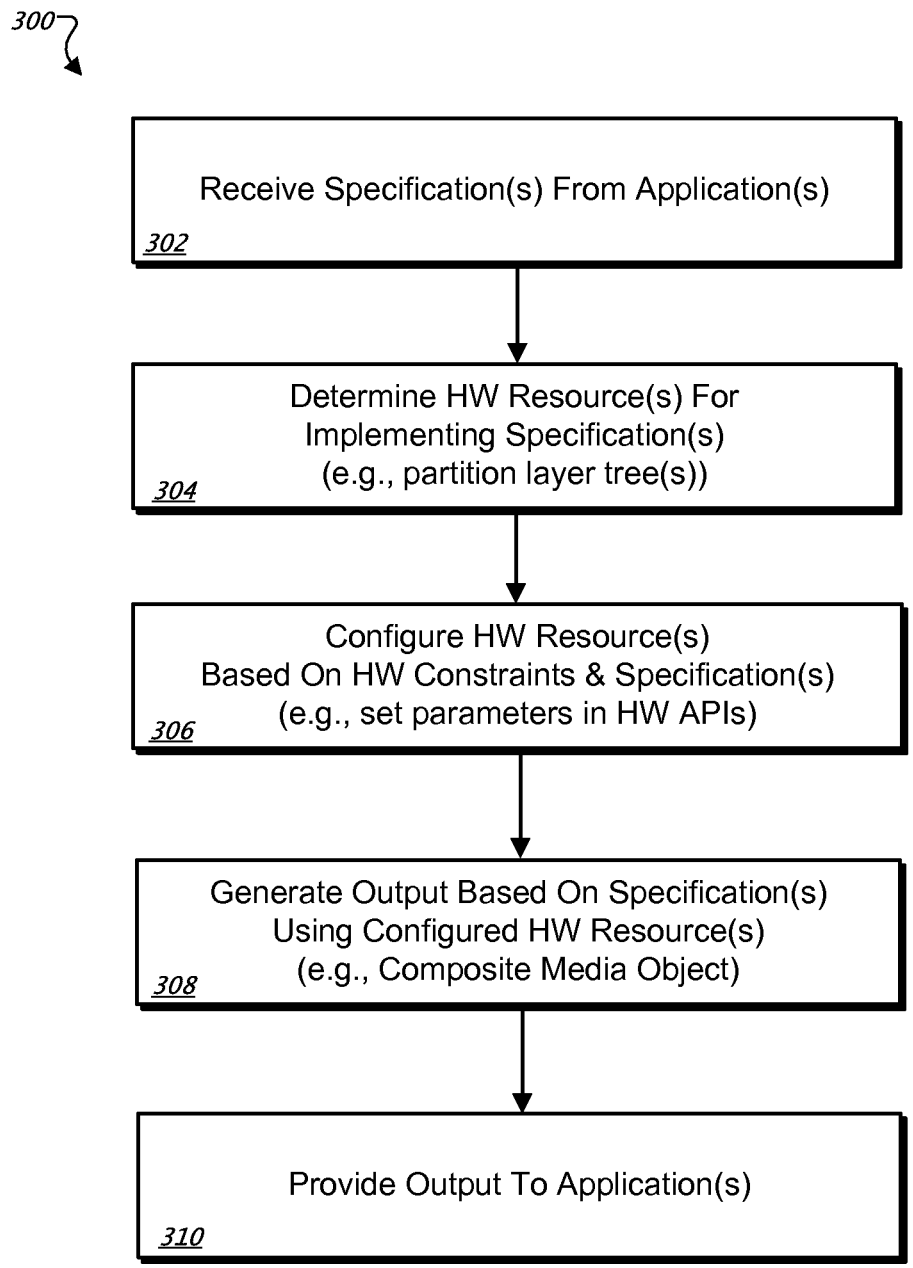
FIG. 3 is a flow diagram of an example process for dynamically rendering display data.

FIG. 3 illustrates a process flow diagram of an example process 300 for dynamically rendering the display data. The layer framework 202 receives 302 from the application 202, one or more specifications for the display data to be rendered. For example, the application 202 can generate a layer tree 116 that provides a hierarchical organization of the different layers of the display data. Various media objects can be associated with each layer of the layer tree 116. For example, the various media objects associated with the UI layer 104 can include the menu object, video frame object, video control object, etc. Based on what is to be rendered on the screen, the layer framework 204 determines how and what layer order to render the display data, and such determination can provide efficiency and optimal appearance on the screen (e.g., how the display data looks on the screen.)

In addition, instead of having coded instructions on how to render the display data described in the layer tree 116, the application 202 simply describes the appearance of the display data. For example, the application 202 need not describe that a 3D box should be rotated 30 degrees using the GPU. Instead, the application 202 simply describes that the display data is a 3D box rotated 30 degrees. From such description of the display data (and not the actual rendering instructions), the layer framework 204 determines how best to render the display data. Likewise, the application 202 need not expressly provide that the movie data 100 should be rendered using a display hardware, and the UI layer 104 should be rendered using the GPU. Instead, the application 202 simply provides that the display data includes a movie data 100 and a UI layer 104. Again, the layer framework 204 determines how best to render the display data.

Because the decision logic 205 is not located within the application 202, the application 202 need not actually perform the rendering processing itself. For example, the application 202 does not need to divide up the rendering work and specify (by coding instructions) how to render each component of the display data. Thus, the application 202 need not specify that the Open GL or some 3D rendering pipelines should be used to render the UI layer 104, or specify using the movie playback APIs to put the video data up on the screen.

Once the specification is received from the application 202, the layer framework 204 determines 304 the available hardware resources 206 for implementing the received specification(s) (e.g., layer tree 116.) The determination 304 can be performed by the decision logic 205 located within the layer framework 204. The decision logic 205 interfaces with the available hardware resources, and thus has knowledge of the available resources. For example, the decision logic 205 knows that there are two CPUs with certain clock rate, architecture, etc.; one or more GPUs, one or more display units; etc. Because the decision logic 205 knows what hardware resources are available (and the specifications of those hardware resources), the decision logic 205 is able to efficiently make decisions on how best to render the display data described in the specification (e.g., layer tree 116) by choosing a particular hardware resource(s) 206 configured in a particular mode.

Once the layer framework 204 determines and identifies the available hardware resources 206, the layer framework 204 executes the decision logic 205 to determine how best to render the display data using the available hardware resources 206. The decision on how best to render the display data can be based on various tradeoff balancing considerations. For example, assume that the display data includes a sequence of image frames with each frame having multiple image object layers to render. The application 202 can use the 3D graphics hardware to copy the image frames into a frame buffer. The contents of the frame buffer can then be rendered using hardware resources specified by the application 202. However, this involves multiple copy (of memory) operations, and such copy operations can be resource expensive (in terms of CPU or GPU usage). In addition to being resource expensive, each GPU rendering operation can cost additional power consumption. In addition, since the application 202 may not have knowledge about the specifics of the available hardware resources 206, the application may not be utilizing the hardware resources 206 in the most efficient manner. In contrast, the layer framework 204 has specific knowledge of the available hardware resources 206, and thus is able to make efficient and dynamic decisions on which hardware resource(s) to use and how to use them to render a particular display data.

Because the decision logic 205 has knowledge of the specifics of the available hardware resources, the decision logic 205 can take advantage of the capabilities of the hardware resources. For example, the resource expensive data copies can be avoided by not taking the actual bits of the display data and copying them into a separate dedicated frame buffer memory. Instead, the display data can be read directly by the display hardware. For example the display hardware may be capable of scanning out multiple frame buffers and compositing them instead of scanning out a single frame buffer.

Functionally, the GPUs are memory to memory type devices. For example, a display controller may only read from memory and then send the read memory data directly to an external display hardware device, such as an LCD unit, with or without image compositing being performed along the way. The techniques and systems according to this specification enable the display hardware to read the display data directly (without performing data copies by the GPU) and perform the image compositing function. Thus, one consideration is the cycles spent by the display hardware performing the image compositing function.

In addition, because the decision logic 205 is directly located within the layer framework 204, the application 202 need not send any of the display data through the GPU, and thus avoid having to perform any of the compositing itself. Instead, the application 202 simply provides that the video data 100 should be composited with the UI layer 104.

For example, the display data may include a movie, with a talking head movie content. The display data can also include a UI layer that sit on top of the movie (e.g., via overlay). The UI layer can include menu object, status bar, etc. One way to render the display day is to use the 3D hardware resource to combine the UI layer and the movie into one buffer of memory. Then the various media objects of the UI layer can be copied into the frame buffer. The contents of the frame buffer are then composited and sent to the display hardware to be displayed. This may be the method used if the application 202 has to perform the decision making process itself in a static manner.

Alternatively, the layer tree 116 can be broken into different portions (one for video and one for UI layer, for example.) The portion of the tree that includes the video can be sent to a particular hardware resource that can best display the video. The portion of the layer tree 116 that includes the UI layer (e.g., the overlay objects) can be composited and sent to a particular hardware that best displays the UI layer. The display hardware can composite the different portions together. This saves the resource expensive copying operations by the GPU. Also, various specifications of the hardware resources 206 can be utilized. For example, different hardware may support better scaling of the video to get better zooming, etc. The particular hardware that can render each portion better is determined. The decision logic 205 located in the layer framework 204 performs the above decisions instead of the application 202.

Once the decision logic 205 in the layer framework 204 determines how best to render (e.g., by selecting which hardware resource(s) to use and in what mode) the display data, the selected hardware resource(s) are configured 306 based on the hardware constraints and specification(s). For example, the various parameters in the various hardware APIs can be selected and set according to the decisions of the decision logic 205. Based on the configured hardware resource(s), the display data is rendered 308 using the specification(s) received from the application 202.

The layer framework 204 interprets the specification(s) received from the application 202 to determine the best way to get the display data onto the display hardware. For example, the layer framework 204 decides, based on the properties of different nodes on the layer tree, the best way to render the display data. In the process, the layer framework 204 makes decisions about all of the available hardware resources 206. These decision making processes are performed dynamically as the display data are received form the application 202.

Because the decision process (the decision logic 205) is centralized to the layer framework 204, the application 202 is no longer responsible for writing custom APIs for each of the hardware resources (e.g., processors). Thus, when a different piece of hardware resource is present, the application 202 does not need to write new custom APIs for the new hardware since that decision making process is removed from the application 202. In this way, only the layer framework 204 need to be updated instead of updating every application 202. Further, the layer framework communicates to each hardware resource independently (independent of each hardware resource and independent of the application 202). Instead of having the application 202 use various APIs that make calls to the hardware, the layer framework 204 interfaces with the hardware resources. So the application 202 simply passes the specifications (e.g., layer tree 116) to the layer framework 204 and the layer framework interprets the layer tree on how best to render the display data.

The generated display output (e.g., compositing a video data with a UI layer) is displayed on output hardware (e.g., a display such as an LCD screen). Further, the generated output can be provided to the application 202.

Figure 4:
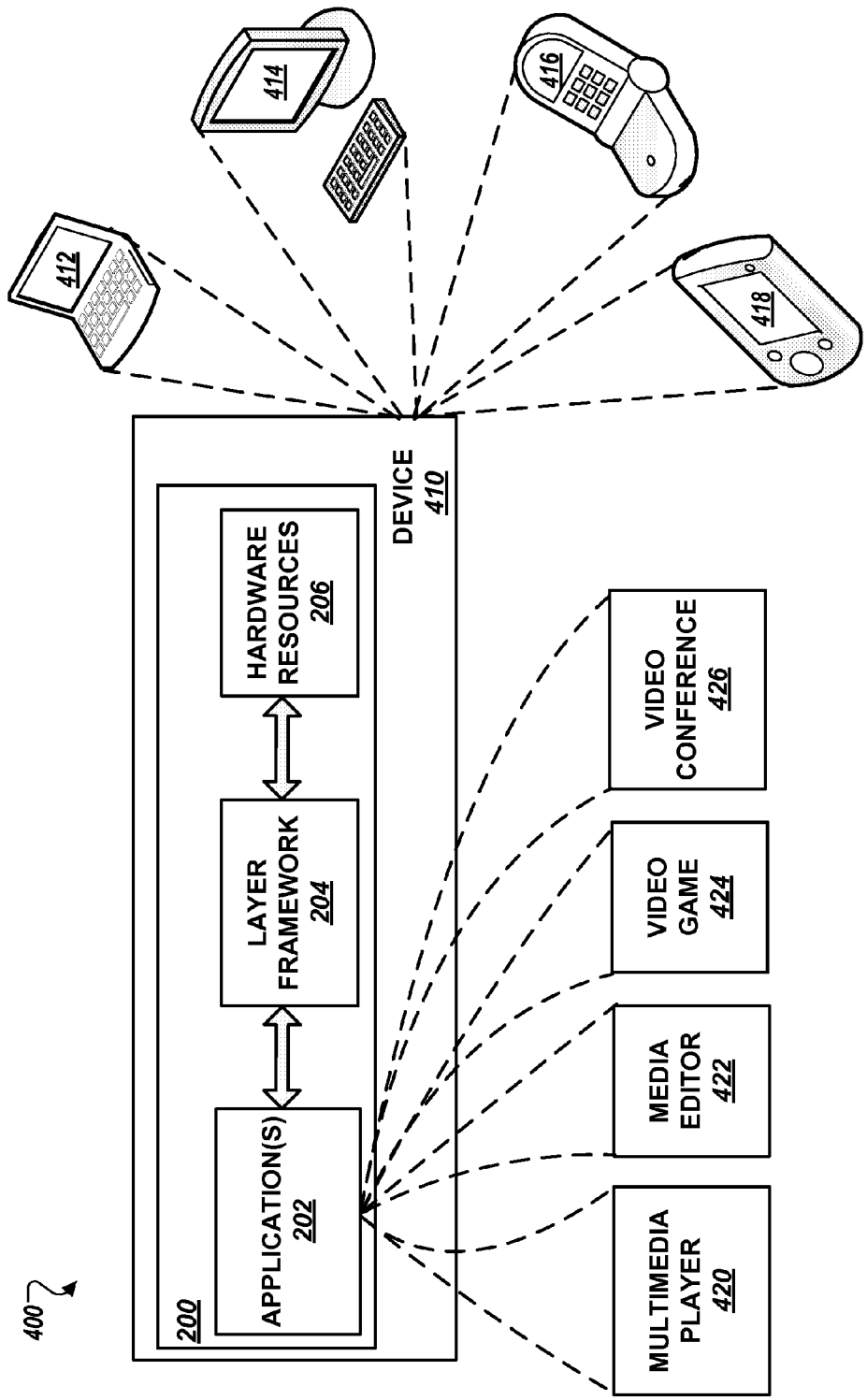
FIG. 4 is a block diagram illustrating various implementations of a system for configuring hardware resources when dynamically rendering various display data.

FIG. 4 is a block diagram illustrating various implementations of the system 200 for configuring hardware resources when rendering various display data. The system 200 is designed to operate in a data processing device 410 such as a laptop 412, a desk top 414 (including a server computer), a mobile phone 416 (including a smart phone), a personal digital assistant (PDA) 418, etc. For example, when the system 200 is implemented in a smart phone 412, the layer framework 204 has knowledge of the hardware resources 206 available in the smart phone 416. The layer framework 204 can be designed specifically for the smart phone 416 based on the available hardware resources 206 in the smart phone 416. The layer framework 204 can be further customized based on specific model of the smart phone 416, for example. Similarly, the layer framework 204 can be designed specifically for the other types of devices 410.

The layer framework 204 can be hard coded into the device 410. Alternatively, the layer framework 204 can be loaded into the device as a software addition/upgrade. In both instances, the layer framework 204 can be updated when any of the available hardware resources are removed or when any new hardware resources are added.

The one or more applications 202 executing on the device 410 can include various applications that involves rendering various display data. For example, the application 202 can include a multimedia player 420, a media editor 422, a video game 424, a video conference application 426, etc. The multimedia player 420 includes applications that enable playback of video and/or audio data. Examples of multimedia players 420 can include Quicktime® player (Apple, Inc. of Cupertino, Calif.) and Windows® Media Player (Microsoft Corporation of Redmond, Wash.). Examples of media editors 422 can include iLife® (Apple, Inc. of Cupertino, Calif.) and Adobe® Photoshop® (Adobe Systems Inc. of San Jose, Calif.).

As described in this specification, the layer framework 204 removes the decision making process (of how best to render the display data), these applications 202 need not perform any of the rendering processes themselves. In addition, the applications 202 can be designed to function independent of a particular device, platform, etc. since the layer framework 204 located separately in the device will determine how best to render the display data requested by the application.

Figure 5:
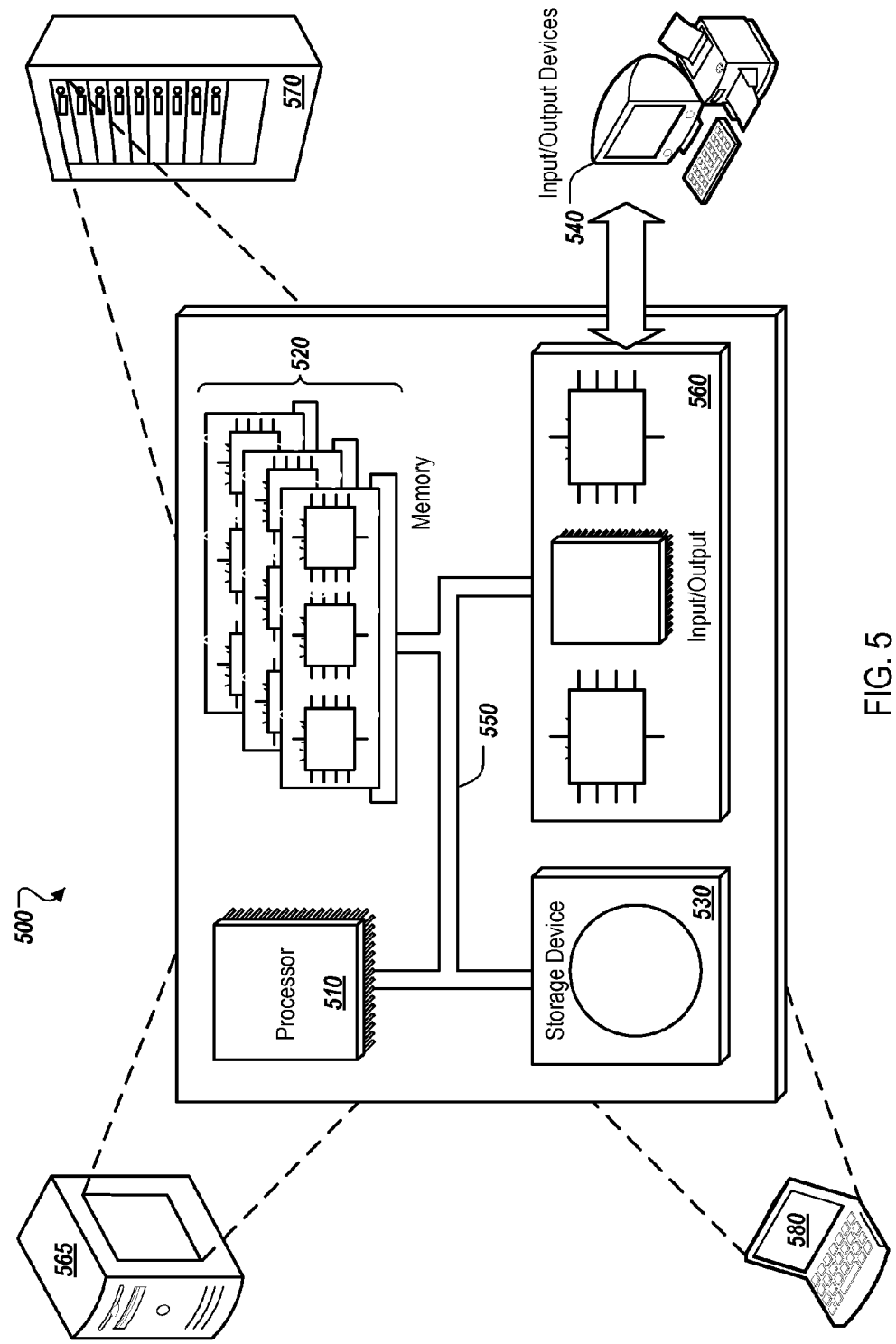
FIG. 5 is a block diagram of a computing device and system that can be used to implement the features and operations described in reference to FIGS. 1-4.

FIG. 5 is a block diagram of a computing device and system that can be used, e.g., to implement dynamic configurations of hardware resources. Computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 500 includes a processor 510, memory 520, a storage device 530, a high-speed interface 550 connecting to memory 520. The computing device can also include high-speed expansion ports (not shown), and a low speed interface (not shown) connecting to low speed bus (not shown) and storage device 530. Each of the components 510, 520, 530, 550, and 520, are interconnected using various busses, and can be mounted on a common motherboard or in other manners as appropriate. The processor 510 can process instructions for execution within the computing device 500, including instructions stored in the memory 520 or on the storage device 530 to display graphical information for a GUI on an external input/output device, such as display 540 coupled to an input/output interface 560. In other implementations, multiple processors and/or multiple buses can be used, as appropriate, along with multiple memories and types of memory. Also, multiple computing devices 500 can be connected, with each device providing portions of the necessary operations (e.g., as a server bank, a group of blade servers, or a multi-processor system).

The memory 520 stores information within the computing device 500. In one implementation, the memory 520 is a computer-readable medium. In one implementation, the memory 520 is a volatile memory unit or units. In another implementation, the memory 520 is a non-volatile memory unit or units.

The storage device 530 is capable of providing mass storage for the computing device 500. In one implementation, the storage device 530 is a computer-readable medium. In various different implementations, the storage device 530 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 520, the storage device 530, memory on processor 510, or a propagated signal.

The high speed controller 550 manages bandwidth-intensive operations for the computing device 500, while the low speed controller manages lower bandwidth-intensive operations. Such allocation of duties is exemplary only. In one implementation, the high-speed controller 550 is coupled to memory 520, display 540 (e.g., through a graphics processor or accelerator), and to high-speed expansion ports (not shown), which can accept various expansion cards (not shown). In the implementation, low-speed controller (not shown) is coupled to storage device 530 and low-speed expansion port (not shown). The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 565, or multiple times in a group of such servers. It can also be implemented as part of a rack server system 570. In addition, it can be implemented in a personal computer such as a laptop computer 580.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A method comprising:
   receiving a request for rendering display data, the display data including a plurality of media objects to be rendered, and the request including a layer tree that describes a hierarchical organization of the plurality of media objects;
   determining an order in which to render each media object of the plurality of media objects included in the display data based on the layer tree;
   identifying a plurality of hardware, each hardware configured to render a media object of the plurality of media objects;
   dynamically selecting, from among the plurality of hardware, a hardware configured to render the plurality of media objects in the order;
   configuring the selected hardware to render the display data in the order; and
   rendering the display data using the configured hardware.

2. The method of claim 1, wherein rendering the display data comprises compositing the display data using the configured hardware.

3. The method of claim 1, wherein dynamically selecting or configuring the hardware comprises:
   identifying a media type for each of the plurality of media objects; and
   configuring the hardware to render each media object based on the identified media type.

4. The method of claim 1, wherein configuring the hardware comprises setting an operating mode of the selected or configured hardware.

5. The method of claim 1, wherein the plurality of hardware is stored in a list, the method further comprising, when detecting a change in the plurality of hardware, updating the list.

6. The method of claim 1, wherein rendering the display data comprises independently interfacing with the configured hardware.

7. The method of claim 1, wherein dynamically selecting the hardware comprises setting one or more parameters of one or more application programming interfaces (APIs).

8. The method of claim 1, wherein dynamically selecting, from among the plurality of hardware, a hardware configured to render the plurality of media objects in the order further comprises selecting the hardware configured to more optimally render the plurality of media objects in the order relative to remaining hardware of the plurality of hardware by:
   comparing a first feature of a first hardware with a second feature of a second hardware; and
   determining that the first hardware can more optimally render the plurality of media objects relative to the second hardware based in response to comparing the first feature with the second feature.

9. The method of claim 1, wherein dynamically selecting, from among the plurality of hardware, a hardware configured to render the plurality of media objects in the order further comprises selecting the hardware configured to more optimally render the plurality of media objects relative to remaining hardware of the plurality of hardware by selecting the hardware that can render the plurality of media objects in a fewest number of operations.

10. The method of claim 1, wherein the hardware configured to render the plurality of media objects in the order includes a plurality of hardware resources, each hardware resource configured to render a media object of a media type, the method further comprising:
   splitting the layer tree into a plurality of portions, each portion including a media object of a media type; and
   rendering each portion using a hardware resource configured to render a media type associated with a media object included in each portion.

11. A non-transitory computer program product, embodied on a computer-readable medium, operable to cause a data processing apparatus to perform operations comprising:
   receiving a request for rendering display data, the display data including a plurality of media objects to be rendered, and the request including a layer tree that describes a hierarchical organization of the plurality of media objects;
   determining an order in which to render each media object of the plurality of media objects included in the display data based on the layer tree;
   identifying a plurality of hardware, each hardware configured to render a media object of the plurality of media objects;
   dynamically selecting, from among the plurality of hardware, a hardware configured to render the plurality of media objects in the order;
   configuring the selected hardware to render the display data in the order according to the layer tree; and
   rendering the display data using the configured hardware.

12. The computer program product of claim 11, wherein rendering the display data further comprises compositing the display data using the selected hardware.

13. The computer program product of claim 11, wherein configuring the selected hardware comprises:
   identifying a media type for each of the plurality of media objects; and
   configuring the selected hardware to render each media object based on the identified media type.

14. The computer program product of claim 11, wherein dynamically configuring the selected hardware comprises setting an operating mode of the selected hardware.

15. The computer program product of claim 11, wherein the plurality of hardware is stored in a list, the operations further comprising, when detecting a change in the plurality of hardware, updating the list.

16. The computer program product of claim 11, wherein rendering the display data comprising independently interfacing with the configured hardware.

17. The computer program product of claim 11, wherein dynamically selecting the hardware comprises setting one or more parameters of one or more application programming interfaces (APIs).

18. A system comprising:
   one or more processors; and
   memory having instructions stored thereon, the instructions, when executed by the one or more processors, cause the processors to perform operations comprising:
      receiving a request for rendering display data, the display data including a plurality of media objects to be rendered, and the request including a layer tree that describes a hierarchical organization of the plurality of media objects;
      determining an order in which to render each media object of the plurality of media objects included in the display data based on the layer tree;
      identifying a plurality of hardware, each hardware configured to render a media object of the plurality of media objects;
      dynamically selecting, from among the plurality of hardware, a hardware configured to render the plurality of media objects in the order;
      configuring the selected hardware to render the display data in the order according to the layer tree; and
      rendering the display data using the configured hardware.

19. The system of claim 18, wherein rendering the display data including compositing the display data using the configured hardware.

20. The system of claim 18, wherein configuring the hardware comprises:
   identifying a media type for each of the plurality of media objects; and
   configuring the hardware to render each media object based on the identified media type.

21. The system of claim 18, wherein configuring the hardware comprises setting an operating mode of the selected or configured hardware.

22. The system of claim 18, wherein the plurality of hardware is stored in a list, and wherein the operations further comprise, when detecting a change in the plurality of hardware, updating the list.

23. The system of claim 18, wherein rendering the display data comprises independently interfacing with each of the selected hardware.

24. The system of claim 18, wherein dynamically selecting the hardware comprises setting one or more parameters of one or more application programming interfaces (APIs).

* * * * *

UNITED STATES PATENT AND TRADEMARK OFFICE
CERTIFICATE OF CORRECTION

PATENT NO.        : 8,610,725 B2                       Page 1 of 1
APPLICATION NO.   : 11/957275
DATED             : December 17, 2013
INVENTOR(S)       : Jeremy Todd Sandmel et al.

It is certified that error appears in the above-identified patent and that said Letters Patent is hereby corrected as shown below:

In the Claims

Col. 3, Claim 3, line 1, delete the words "dynamically selecting or".

Col. 14, Claim 16, line 2, change "comprising" to --comprises--.

Col. 14, Claim 19, line 2, change "including" to --includes--.

Signed and Sealed this
Twenty-fifth Day of February, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,610,725 B2  Page 1 of 1
APPLICATION NO. : 11/957275
DATED : December 17, 2013
INVENTOR(S) : Jeremy Todd Sandmel et al.

It is certified that error appears in the above-identified patent and that said Letters Patent is hereby corrected as shown below:

In the Claims

Col. 13, Claim 3, line 4, delete the words "dynamically selecting or".

Col. 14, Claim 16, line 24, change "comprising" to --comprises--.

Col. 14, Claim 19, line 54, change "including" to --includes--.

This certificate supersedes the Certificate of Correction issued February 25, 2014.

Signed and Sealed this
Eighteenth Day of March, 2014

Michelle K. Lee
*Deputy Director of the United States Patent and Trademark Office*